(No Model.) 5 Sheets—Sheet 1.
H. F. PARSHALL.
REGULATING DEVICE FOR CAR MOTORS OR OTHER ELECTRICAL APPARATUS.
No. 534,078. Patented Feb. 12, 1895.
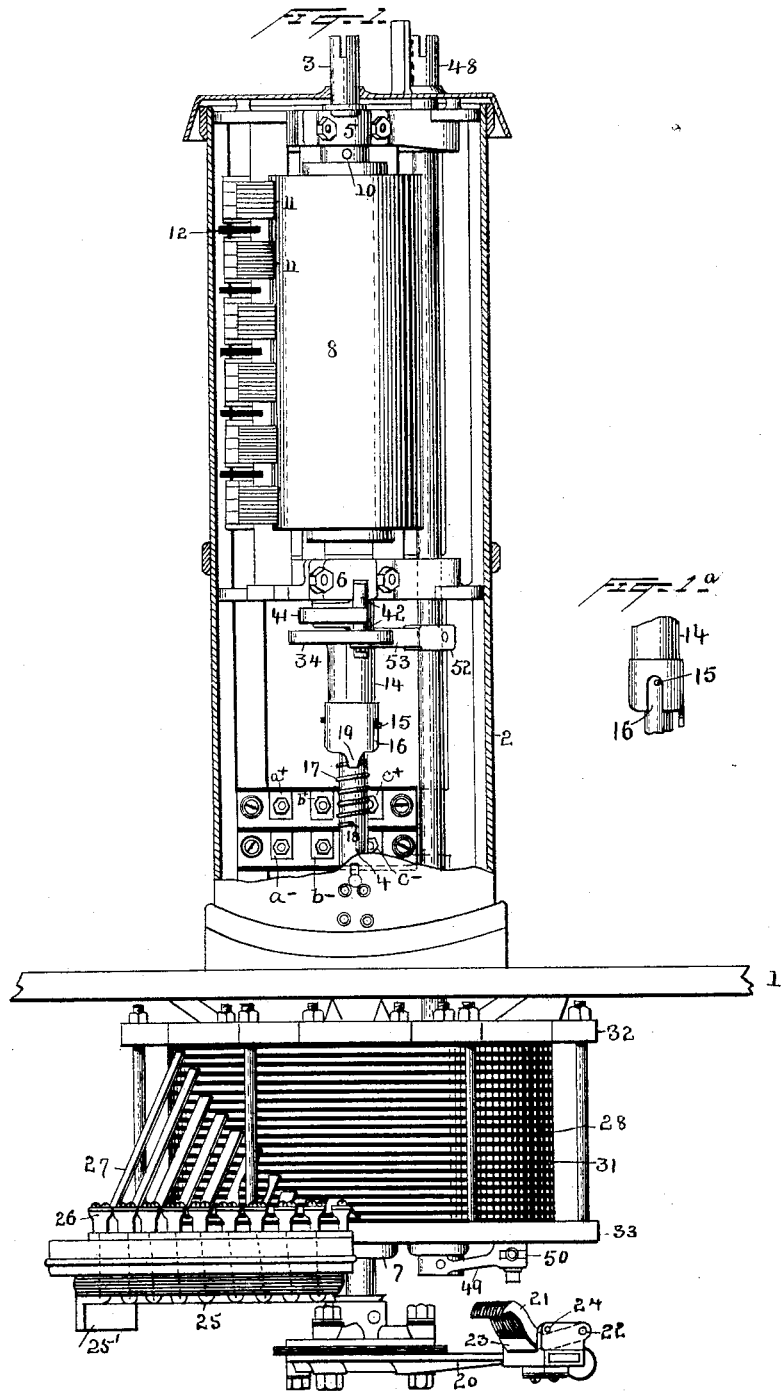
Witnesses
Norris A. Clark.
N. F. Oberle
Inventor
H. F. Parshall
By his Attorneys
Dyer & Seely (No Model.) 5 Sheets—Sheet 2.
H. F. PARSHALL.
REGULATING DEVICE FOR CAR MOTORS OR OTHER ELECTRICAL APPARATUS.
No. 534,078. Patented Feb. 12, 1895.
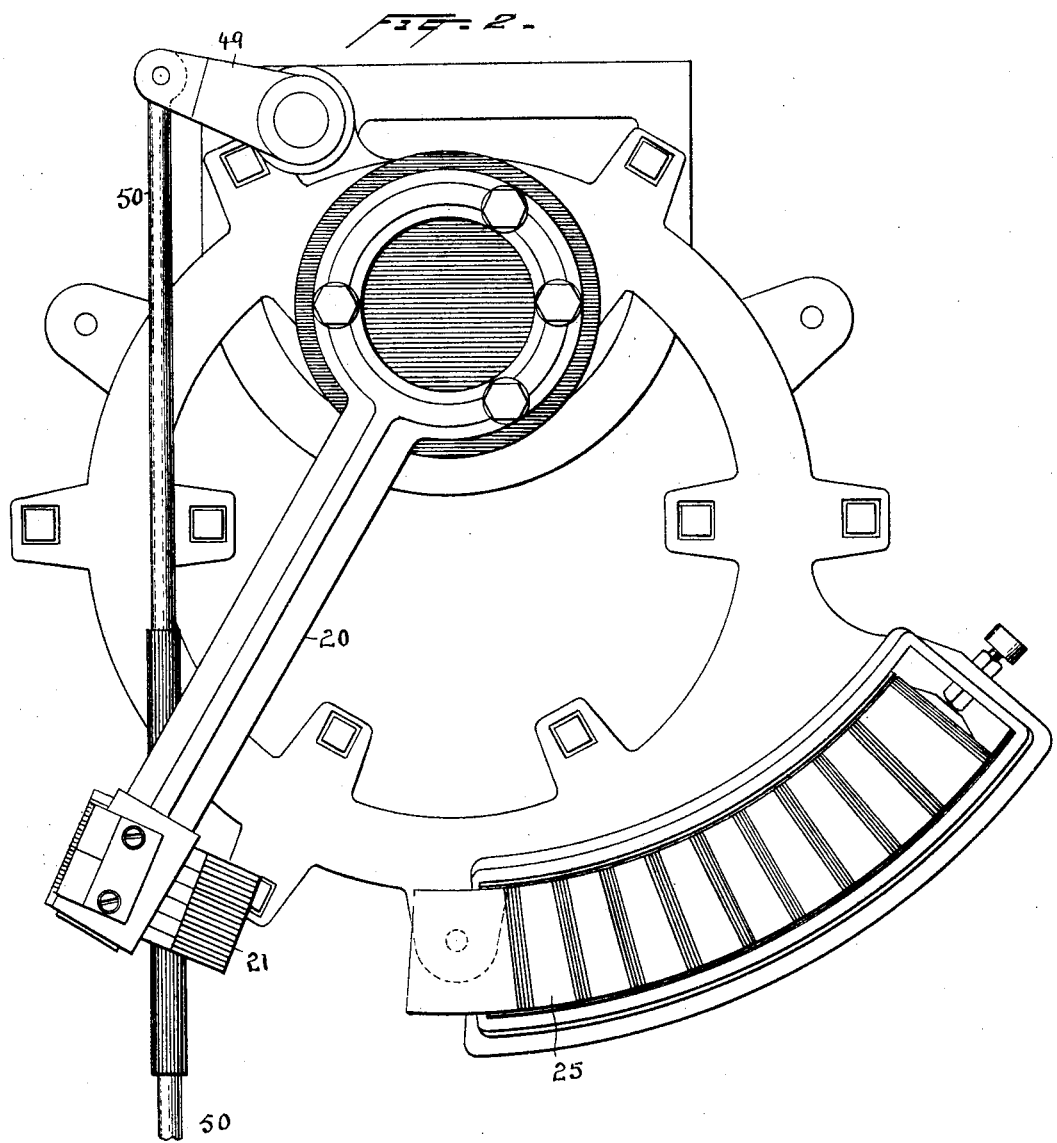

(No Model.) 5 Sheets—Sheet 3.
H. F. PARSHALL.
REGULATING DEVICE FOR CAR MOTORS OR OTHER ELECTRICAL APPARATUS.
No. 534,078. Patented Feb. 12, 1895.
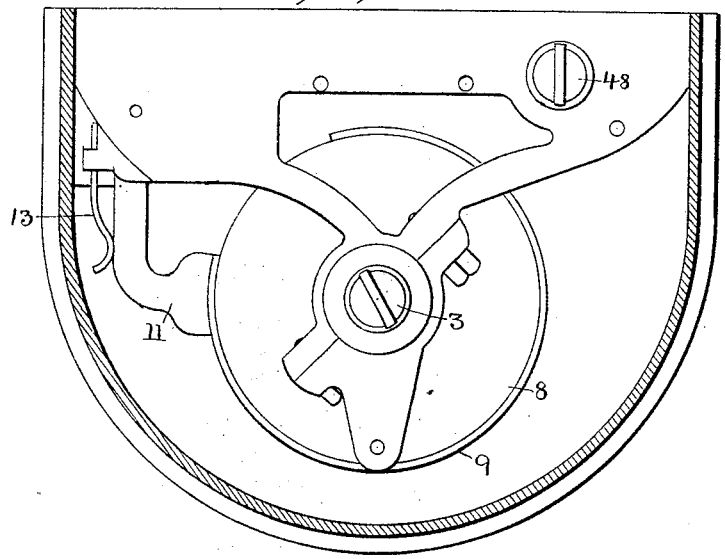
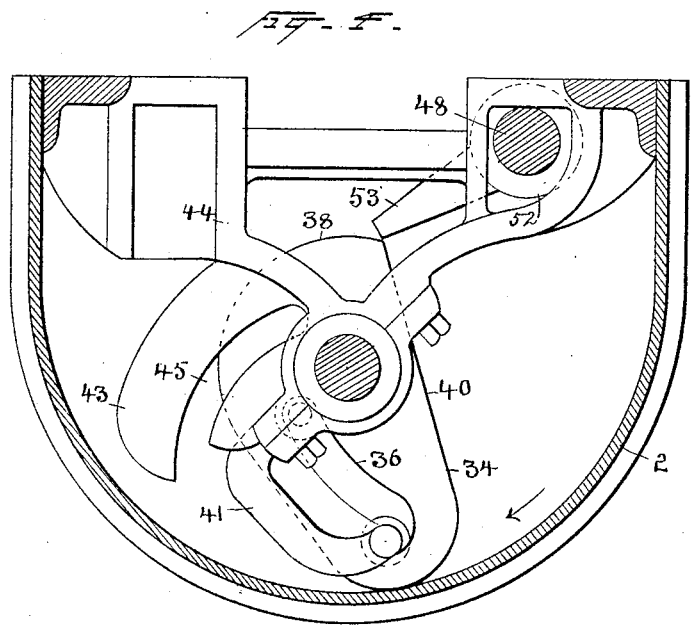
Witnesses
Norris A. Clark.
N. F. Oberly
Inventor
H. F. Parshall
By his Attorneys
Dyer & Seely

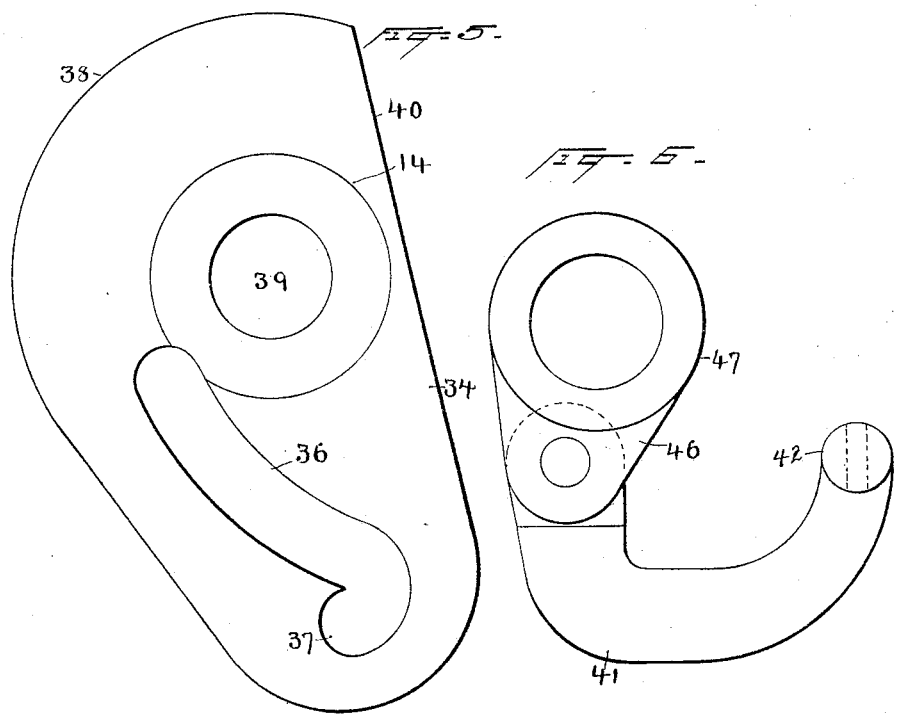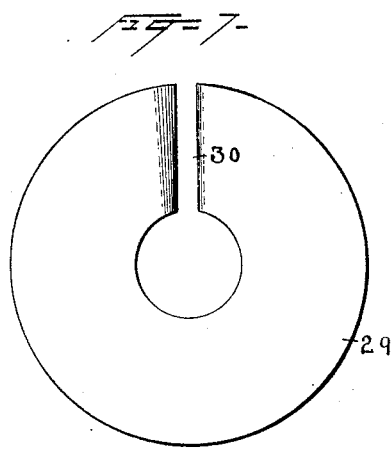

(No Model.) 5 Sheets—Sheet 5.
H. F. PARSHALL.
REGULATING DEVICE FOR CAR MOTORS OR OTHER ELECTRICAL APPARATUS.
No. 534,078. Patented Feb. 12, 1895.
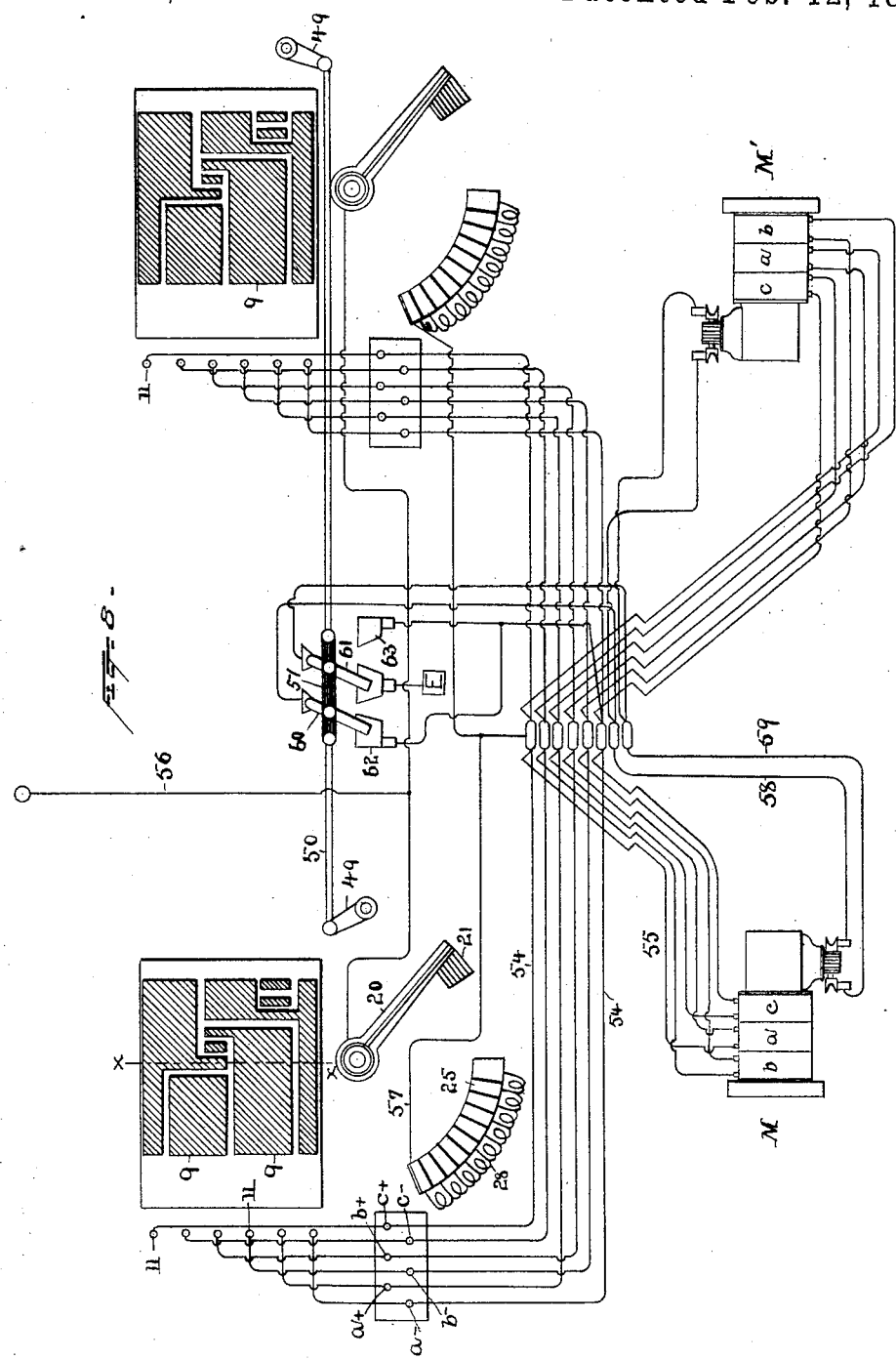

United States Patent Office.

HORACE F. PARSHALL, OF SCHENECTADY, ASSIGNOR TO THE EDISON GENERAL ELECTRIC COMPANY, OF NEW YORK, N. Y.

REGULATING DEVICE FOR CAR-MOTORS OR OTHER ELECTRICAL APPARATUS.

SPECIFICATION forming part of Letters Patent No. 534,078, dated February 12, 1895.

Application filed December 11, 1891. Serial No. 414,720. (No model.)

*To all whom it may concern:*

Be it known that I, HORACE F. PARSHALL, a citizen of the United States, residing at Schenectady, in the county of Schenectady and State of New York, have invented a certain new and useful Improvement in Regulating Devices for Car-Motors or other Electrical Apparatus, of which the following is a specification.

The present invention relates to a combined switch and rheostat mechanism designed especially for controlling motors having several coils, and especially motors mounted on cars for propelling them.

The device to be described is provided with an artificial or idle resistance, a switch-arm adapted to make contact with the resistance at successive points, and a second switch device which is connected to the several coils on the motor, the latter switch device being operated after the first switch, as hereinafter more fully set forth.

The main objects of the invention are, to provide a simple and practicable apparatus for effecting the several changes of circuit connections required in controlling a motor, the connections being such as to thoroughly protect the motor armature in opening and closing the circuit.

Another object is to provide ready means for reversing the motor, but locking said means so that it cannot be operated except when the controlling switch and resistance device are in a predetermined position.

Other features of the invention will be hereinafter indicated.

In the accompanying drawings, Figure 1 is a front view of my preferred form of apparatus with a part of the inclosing box broken away. Fig. 1ª shows a detail hereinafter described. Fig. 2 is an end view of the apparatus looking from beneath. Fig. 3 is a plan view with the top cover removed. Fig. 4 is a section taken just below the drum of the switch. Fig. 5 is a plan view of the sleeve which connects the upper and lower sections of the shaft and its enlarged head. Fig. 6 is a plan view of two arms or levers hereinafter described. Fig. 7 is a plan of one section of the resistance conductor; and Fig. 8 is a diagram illustrating the circuit connections and switches on a car.

In the drawings, 1 indicates the floor of a car platform, on which stands the sheet metal or other inclosing case 2, within which the main part of the switch mechanism is inclosed. Passing vertically through this casing are two shafts. The central shaft is in two sections 3, 4, having bearings 5, 6, 7. On the upper section is the drum 8, on which the metallic plates 9 (see Figs. 3 and 8) are mounted, these plates being of proper shape and arrangement for changing the connection of the several coils on the field-magnet of the motor. Said drum is preferably secured to the shaft by suitable means, such as pin 10, so as to turn with the shaft.

11 are switch brushes or devices in position to bear on the plates arranged on the drum to control the several circuits. These brushes are preferably separated by insulating plates 12, and are pressed forward by springs 13.

The lower section of the shaft is connected to the upper section by means of the sleeve 14, which fits over the meeting ends of the two sections, and which is connected to the lower section preferably by means of the pin 15, which extends through the lower section of the shaft, the ends resting in slots 16 in the lower end of the sleeve 14. These slots are somewhat wider than the diameter of the pin 15.

17 is a stiff metal spring coiled on the shaft and connected thereto at 18 and to the sleeve 14 at 19. This spring tends to hold the sleeve 14 with one side of the slot behind the pin resting directly against the pin, so that when the sleeve is moved forward the pin will be moved at the same instant, but on the return motion of the sleeve it can move a short distance before the opposite side of the slot comes in contact with the pin, in an obvious manner, and for a purpose hereinafter indicated. At the lower end of this section of the shaft is a switch-arm 20, carrying at its outer end a contact device 21 made up of sheets of soft iron cut in the proper shape and placed together preferably alternating with insulating washers. This contact device is pivoted at 22 and is forced up by a spring 23 against a stop 24 and is adapted to travel over the contacts 25, which are connected by posts 26 and conductors 27 to the resistance 28 at successive points. Said resistance is shown supported below the car-bottom and consists of a series of metal disks or rings 29 (see Fig. 7), the disks or rings being cut on one side as indicated at 30. Several of these disks or rings are placed together, each having one end in contact with a similar disk or ring above it, and the other end in contact with another below, whereby said disks or rings form a continuous helix. The adjacent layers of the spiral are separated by suitable insulation 31. These disks are supported between the plates 32, 33, suitably secured together and to the car-bottom.

The sleeve 14 above referred to is provided with an enlarged head 34, provided with a curved slot 36, extending from near the opening which surrounds the shaft to a point near the outer extremity of the head, at which point it is provided with an enlargement or socket 37. This head is preferably provided with a curved end 38, the center of the curve being at 39, and the side 40 is straight, or at least is nearer to the center than the side 38. The purpose of this will be hereinafter indicated.

41 is a curved arm, having at one end a cross-pin 42, the lower end of which is adapted to ride in the slot 36 and which normally, that is, when the circuit is open, stands at 37. The upper end of the pin extends in the opposite direction and is adapted to strike the arm 43 (Fig. 4) which extends from the bracket 44. This bracket is provided with a curved slot 45, the faces of which have the same curve as those of slot 36. The second end of arm 41 is adapted to be pivoted to the arm 46 which projects from the sleeve 47 mounted on and secured to the upper section of the shaft. The arrangement just described forms an automatically detachable connection between the two sections of the shaft, as will be seen from the description of the operation.

The second shaft is at one side and to the rear of the first mentioned shaft and is numbered 48. This shaft has at its lower end a crank arm 49, to which is pivoted a rod 50, which extends to a reversing switch 51. (See Fig. 8.) This rod 50 preferably extends the whole length of the car and is connected to a crank 49 at each end, so that the same reversing switch can be operated from either end of the car. The shaft 48 is also provided with a sleeve 52 secured to the shaft and having a projecting arm 53 which stands in the same horizontal plane as the head 34. When said head is in the position which it occupies when the field-magnet circuits are open, the straight side 40 will stand adjacent to the end of the arm 53 and said arm will be free to move, but when the switch is turned in the direction indicated by the arrow (Fig. 4), to close said circuits, the curved end 38 will come adjacent to the end of arm 53 and will lock the latter so that it cannot be turned to move the reversing switch until the head 34 is moved back to its original position.

In the position shown in Figs. 3 and 4 the drum has been turned sufficiently far to bring the advance edge of the contact plates under the switch brushes, and this occurs when or just after the switch device 21 reaches the first contact connected to the resistance coil. This puts all of the field-magnet coils and the resistance in series.

$a+$, $b+$, $c+$, and $a-$, $b-$, $c-$, Fig. 1, are positive and negative binding posts respectively, and are similarly marked in the diagram, Fig. 8.

Referring now to Fig. 8 the general arrangement of the apparatus and circuits will be indicated.

M, M' are two motors, supposed to be mounted below the floor of a car. These motors have several field-magnet coils $a$, $b$, $c$.

The first mentioned binding posts $a+$, &c., are connected to the coils of the field-magnet of the first motor by wires 54, 55, and the connection being the same to the coils of the second motor, if such second motor is employed.

56 indicates the trolley, adapted to take current from an overhead or other wire, and is connected to the brushes 21 adapted to move over the contacts of resistance 28 in the manner already described, the last resistance contact being connected by wire 57 to the first wire 54.

The armature wires 58, 59 are connected respectively to the levers 60, 61 of the reversing switch, the contacts 62, 63 of which are connected to the lower wire 54, and the central contact 64 of which is connected to earth.

If the car is at rest and it is desired to start it, the central shaft is turned by any suitable handle or device. The first effect of turning said shaft is to move the contact device 21 onto the resistance contacts 25, first throwing the entire resistance into circuit in series with the field-magnet coils and armature. Then as the shaft is turned this resistance is gradually thrown out of circuit, and when this switch device reaches the last contact, where it is brought to rest by coming against the flange 25', all of the resistance will be out of circuit. In turning the shaft as just described, the arm 46 is carried around toward the left, pulling arm 41 and, by means of pin 42, the head 34, but just before the switch device 21 reaches the last contact the upper end of the pin 42 strikes arm 43 and is forced out of the end socket of the slot. As the shaft continues to rotate, the pin 42 will ride along in the slots 36, 45, which are now parallel with each other, but will not pull on the head 34 to turn it, but the drum and its section of the shaft continue to rotate, thus, after the resistance is cut out, bringing other contact plates 9 under the brushes 11 and suitably commutating the field-magnet coils. With the plates 9 shaped and arranged as indicated in the diagram, the field-magnet coils will first all be connected in series. As the plates advance, bringing the line $x$ under the brushes, the coils $b$ and $c$ will be thrown in series, but the coil $a$ will be cut out. The succeeding contact plates are arranged to throw the coils into different combinations and from series to parallel. When the shaft is turned in the reverse direction, the pin 42 will travel back in the slots in an obvious manner. During this reverse movement the friction of the contact 21 tends to hold the lower section of the shaft back so that the pin 15 is caused to rest against the opposite side of the slot 16, the spring 17 being slightly tightened or coiled thereby. When the brush 21 reaches the first resistance contact it will be instantly carried therefrom by the spring 17, thereby breaking the circuit by a snap movement. When the car is in motion, if it is desired to reverse the direction of travel, the central shaft must be turned back to its original position, thereby opening the motor circuit in order to move the head 34 out of the way of the arm 53 as already indicated. This makes it impossible to reverse the motor when the circuits are in such condition that damage might result. It is clear that the connections to the two motors are identical and if the circuits of one motor become inoperative in any manner it will not affect the other motor, and either motor and the switch at either end of the car may be omitted.

What I claim is—

1. A regulator or controlling device for electric machines with several coils, having in combination a resistance, a switch for throwing the same into and out of circuit with said machine, means for arresting the switch after it has moved over the resistance contacts, and a second switch mechanism moved by the same device as the first switch, the contacts of the latter switch being arranged to change the connection of the coils of the machine after the first switch has operated, substantially as described.

2. A regulator or controlling device for electric machines with several coils, having in combination a resistance, a switch for throwing the same into and out of circuit with said machine, means for arresting the switch after it has moved over the resistance contacts, a second switch mechanism moved by the same device as the first switch, the contacts of the latter switch being arranged to change the connection of the coils of the machine after the first switch has operated, and a reversing switch operated by a separate handle, substantially as described.

3. The combination with a series motor having several field-magnet coils, of a resistance, a switch for throwing the same into and out of the motor circuit, and a second switch operating only after the first to change connection of the field-magnet coils, from series to multiple substantially as described.

4. The combination, in a controlling device for electrical apparatus, of a rotatable, sectional shaft, a resistance conductor, and contacts connected to different points therein, a switch-arm movable over said contacts and connected to one section of the shaft, a body on the other section having switch contacts, co-operating contact brushes or devices, and an automatically detachable connection between the sections of the shaft, whereby when one section is arrested the other section can continue to move, substantially as described.

5. The combination, in a controlling device for electrical apparatus, of a rotatable, sectional shaft, a resistance conductor and contacts connected to different points therein, a switch-arm movable over said contacts and connected to one section of the shaft, a body on the other section having switch contacts, co-operating contact brushes or devices, an automatically detachable connection between the sections of the shaft, whereby when one section is arrested the other section can continue to move, and a spring acting on the first mentioned section in the direction to cause a snap break, substantially as described.

6. The combination, in a controlling device for electrical apparatus having several coils, of a rotatable, sectional shaft, a resistance conductor and contacts connected to different points therein, a switch-arm movable over said contacts during the first part of the rotation of the shaft and connected to one section of the shaft, a body on the other section having switch contacts, co-operating contact brushes or devices, the contacts being so located on the body as not to change the connection of the coils until the body has rotated through a considerable arc, and an automatically detachable connection between the sections of the shaft, substantially as described.

7. The combination of a sectional shaft, the sleeve on the meeting ends thereof, said sleeve having an enlarged head with a curved slot in it, said sleeve having continuous connection with one section of the shaft, an arm pivoted to an extension of the other section of the shaft and having a pin resting in the slot, whereby when the shaft is turned the pin pulls the head and hence the other section of the shaft around, and means for arresting the movement of the pin in the direction to move the section of the shaft as set forth, the slot being so shaped that the pin can then move in a different direction without moving said section of the shaft, substantially as described.

8. The combination of a shaft having two sections, the sleeve thereon having a head provided with a slot, the arm having a cross-pin adapted to ride in the slot, the stationary arm for arresting the pin, substantially as described.

9. The combination of the main shaft, switch apparatus moved thereby for controlling the motor, the second shaft parallel with the first and a reversing switch moved thereby, and an arm on said second shaft, which arm is locked or released by movement of the first mentioned switch, substantially as described.

This specification signed and witnessed this 7th day of December, 1891.

HORACE F. PARSHALL.

Witnesses:
FRED A. PHELPS, Jr.,
JOSEPH INSULL.